United States Patent
Wells

(10) Patent No.: US 9,770,983 B2
(45) Date of Patent: Sep. 26, 2017

(54) PORTABLE HAND CONVERTER FOR A MOTOR VEHICLE

(71) Applicant: Martin Douglas Wells, Richmond, VA (US)

(72) Inventor: Martin Douglas Wells, Richmond, VA (US)

(\*) Notice: Subject to any disclaimer, the term of this patent is extended or adjusted under 35 U.S.C. 154(b) by 186 days.

(21) Appl. No.: 14/601,606

(22) Filed: Jan. 21, 2015

(65) Prior Publication Data
US 2015/0283900 A1 Oct. 8, 2015

Related U.S. Application Data

(60) Provisional application No. 61/976,533, filed on Apr. 8, 2014.

(51) Int. Cl.
*G05G 1/00* (2006.01)
*B60K 26/02* (2006.01)

(52) U.S. Cl.
CPC ........ *B60K 26/02* (2013.01); *B60K 2026/028* (2013.01); *B60Y 2304/076* (2013.01); *Y10T 29/49716* (2015.01); *Y10T 74/20396* (2015.01)

(58) Field of Classification Search
CPC ............. B60W 30/18; B60W 2540/10; B60W 2540/12; B60K 2026/028; B60K 26/02; B60Y 2304/076
USPC .......................................................... 74/481
See application file for complete search history.

(56) References Cited

U.S. PATENT DOCUMENTS

| | | | | |
|---|---|---|---|---|
| 2,602,348 A | * | 7/1952 | Wilson | B60W 30/18 477/209 |
| 2,777,335 A | * | 1/1957 | Engberg | B60K 26/02 477/209 |
| 4,998,983 A | * | 3/1991 | Ruprecht | B60W 30/18 477/209 |
| 5,029,679 A | * | 7/1991 | Kim | B60W 30/18 477/209 |
| 5,129,492 A | * | 7/1992 | Lenz | B60T 7/08 477/27 |
| 5,323,889 A | * | 6/1994 | Bednarek | B60W 30/18 254/DIG. 5 |
| 6,161,449 A | | 12/2000 | Fujimori | |
| 7,621,365 B2 | | 11/2009 | Egan | |
| 7,970,514 B2 | | 6/2011 | Aberhard et al. | |
| 8,100,217 B2 | | 1/2012 | Crombez | |
| 8,328,237 B2 | | 12/2012 | Woo et al. | |

\* cited by examiner

*Primary Examiner* — Jake Cook

(57) ABSTRACT

A portable hand converter for enabling foot-free operation of a conventional motor vehicle. An upper assembly includes a support plate enabling attachment to the steering column of a motor vehicle and a pivotally attached handle. Two adjustable action arms, pivotally connected to the handle, each include a threaded rod slideable within a hollow tube and an adjustable lock nut for adjusting the length of the action arm. A lower end of each action arm is pivotally connected to a pedal clamp assembly. The pedal clamp assemblies enable connection of the lower end of each action arm to one of the foot-operated pedals of a motor vehicle. Attaching the support plate to the steering column and the pedal clamp assemblies to the brake pedal and gas pedal respectively, and adjusting the length of the adjustable action arms enables total control of the motor vehicle by the operator's hands.

12 Claims, 6 Drawing Sheets

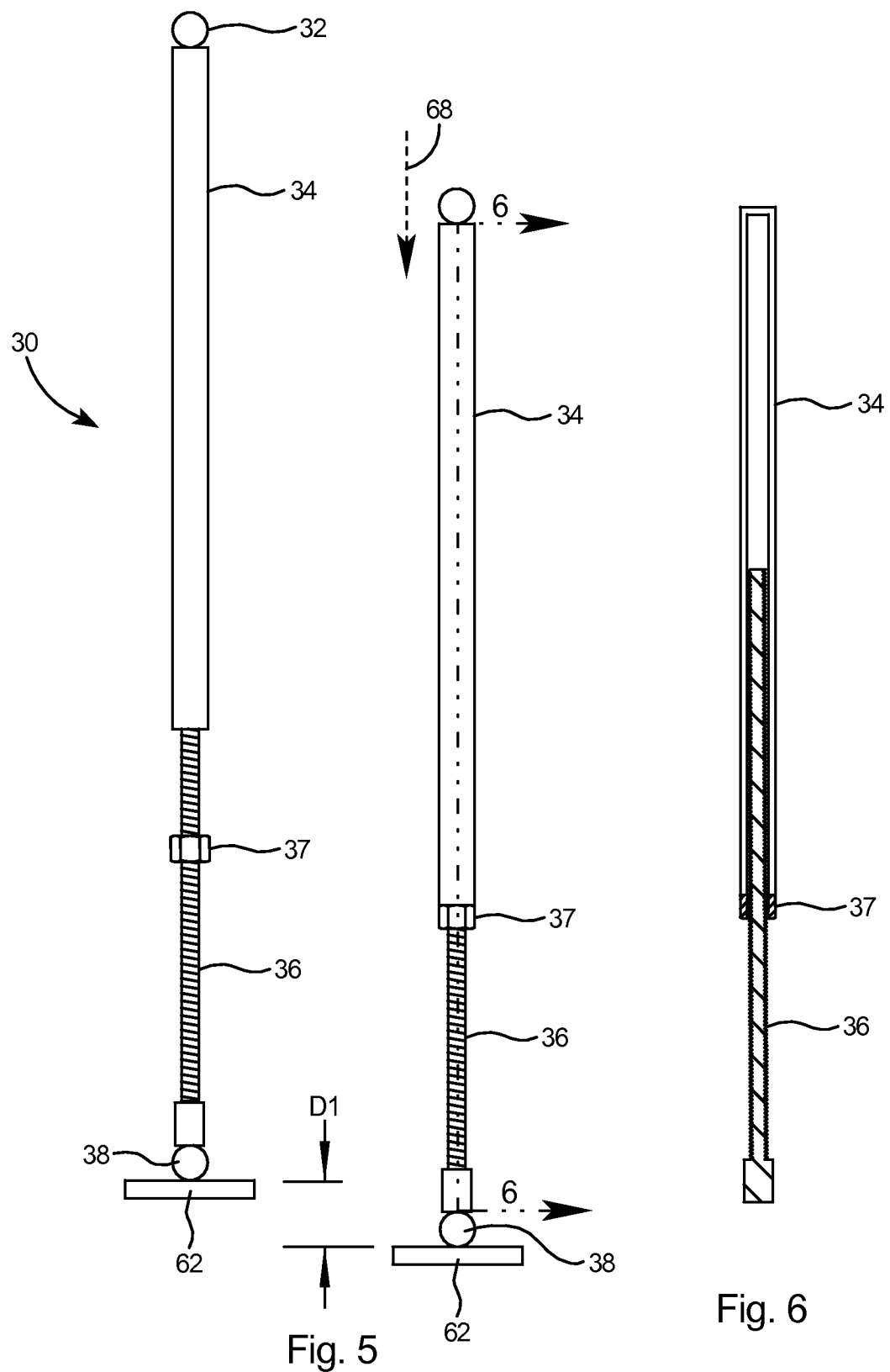

PORTABLE HAND CONVERTER FOR A MOTOR VEHICLE

This application claims the priority of Provisional U.S. Patent Application Ser. No. 61/976,533 filed Apr. 8, 2014.

FIELD OF THE INVENTION

The present invention relates to motor vehicles and specifically to a portable hand converter for enabling a lower extremity disabled person to operate the motor vehicle with his or her hands.

BACKGROUND OF THE INVENTION

Operation of a standard automobile typically requires the use of the operator's hands to operate the steering wheel and at least one of the operator's feet to operate the accelerator pedal and the brake pedal. Many disabled persons with lower extremity injuries are consequently not able to operate a standard automobile. Although some automobiles are adapted to accommodate disabled persons, the equipment used to adapt the vehicle is typically permanently installed and, as a result, is not transportable from one vehicle to another. Many families have more than one vehicle and the permanent equipment makes it impossible for the disabled person to switch to a vehicle that is not modified with the permanent, non-portable equipment.

Accordingly, there is a need for a portable hand converter for a motor vehicle that enables a lower extremity disabled person to operate the motor vehicle. The portable hand converter should be capable of being easily detached from one vehicle and reattached to a second vehicle. The portable hand converter furthermore should be capable of attachment to substantially any make or model of automobile.

BRIEF SUMMARY OF THE INVENTION

The current invention is a portable hand converter for enabling foot-free operation of a conventional motor vehicle. An upper assembly includes a support plate with means for attachment to the steering column of a motor vehicle and a handle pivotally connected to the support plate. Two adjustable action arms are connected to and rotatable with respect to the handle by an upper ball joint. Adjustable action arms include a threaded rod slideable within a hollow tube and an adjustable lock nut for enabling adjustment of the length of the action arm. A lower ball joint connects the lower end of each action arm to a pedal clamp assembly. The pedal clamp assemblies enable connection of the lower end of each action arm to one of the foot-operated pedals of a motor vehicle. Attaching the support plate to the steering column and the pedal clamp assemblies to the brake pedal and gas or accelerator pedal respectively, and adjusting the length of the adjustable action arms enables complete control of the motor vehicle by the user's hands.

OBJECTS AND ADVANTAGES

A first object of the current invention is to provide a means of converting a conventional motor vehicle to hand operation for persons with loss of lower-extremity function. The portable hand converter is completely adjustable and adaptable to fit any make or style of vehicle.

A second object of the invention is to enable car dealerships and rental facilities to easily convert their vehicles to complete operation by hand. The portable hand converter would render any make or style of vehicle drivable by anyone who doesn't have the use of their lower extremities.

A further object of the invention is to enable the disabled who lack the ability to use their feet to test drive vehicles at car dealerships.

A further object of the invention is to provide a means for disabled persons with lower extremity injuries to operate a conventional motor vehicle strictly by the use of their hands.

Another object of the invention is to completely eliminate the use of an operator's feet for controlling the gas and brake pedals of an automobile.

A further object of the invention is to provide a portable hand converter for easy attachment to a conventional motor vehicle in order to provide foot-free operation of the vehicle and thus enable a lower extremity disabled person to operate the motor vehicle.

Another object of the invention is to provide a portable hand converter that is portable or capable of being easily detached from one vehicle and reattached to a second vehicle, regardless of the vehicle make and model.

A further object of the invention is to provide a portable hand converter having adjustable action arms to enable adjustment of the converter to fit substantially any make or model of automobile.

These and other advantages will become apparent by reading the attached specification and claims in conjunction with reference to the attached drawings.

BRIEF DESCRIPTION OF THE DRAWINGS

Reference is made herein to the accompanying drawings, which are not necessarily drawn to scale, and wherein:

FIG. 5 is a side view of the adjustable action rod portion of the portable hand converter depicting the action rod in the pedal disengaged position and in the pedal engaged position.

FIG. 6 is a sectional view of the adjustable action rod taken along line 7-7 of FIG. 5.

DETAILED DESCRIPTION

Figure 1:
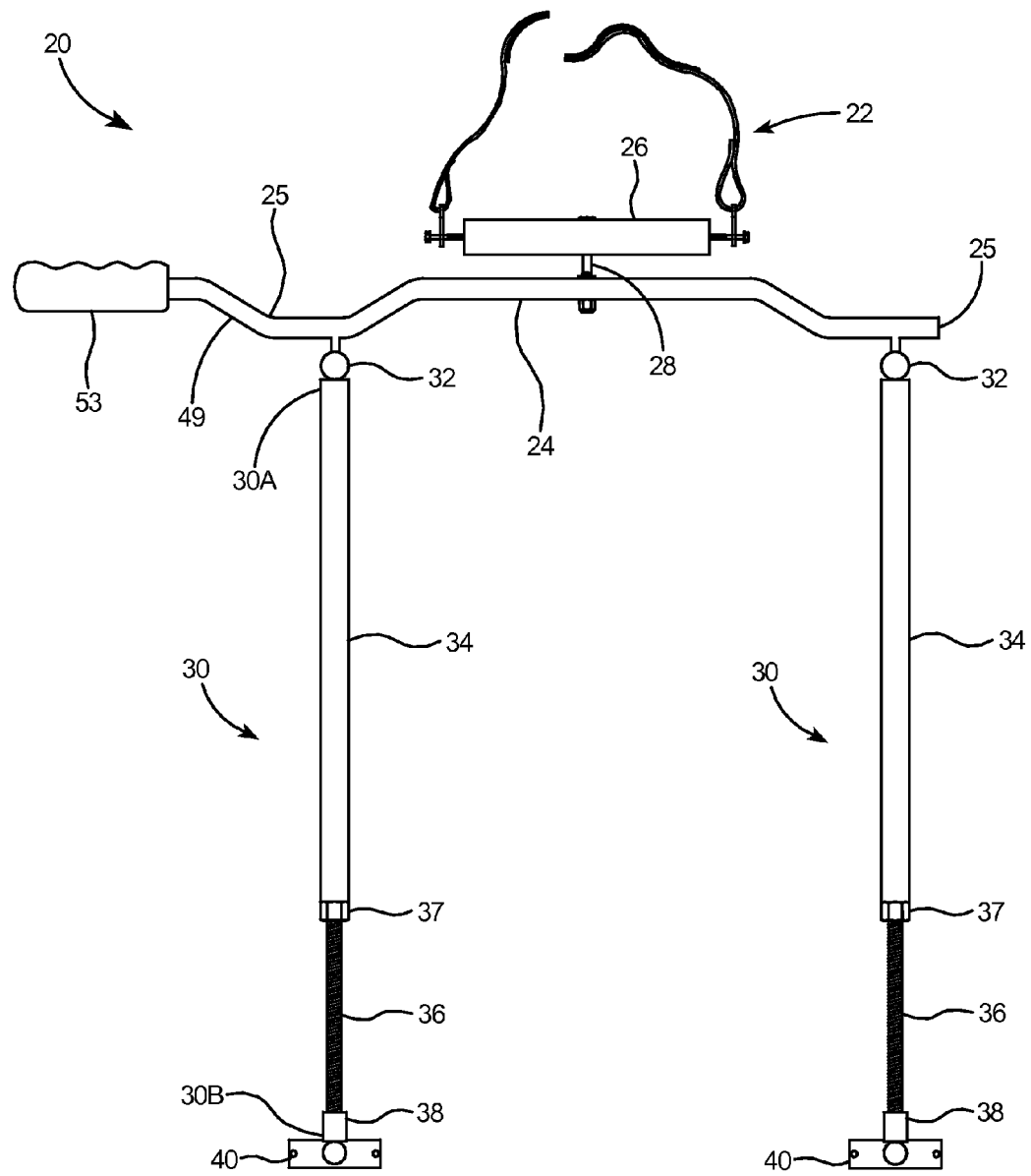
FIG. 1 is a front elevation view of a portable hand converter according to the present invention.

Referring to FIG. 1, there is shown a portable hand converter 20 for attachment to a motor vehicle (not shown). The portable hand converter 20 includes an upper assembly 22 having a handle 24 pivotally connected to a support plate 26. A connector bolt 28 connects the handle 24 to the support plate 26.

The portable hand converter 20 further includes two elongated adjustable action arms 30 each including an upper or first end 30A and a lower or second end 30B. The upper end 30A of each adjustable action arm 30 is connected to and rotatable with respect to the handle by an upper ball joint 32.

Adjustable action arms 30 include a hollow tube 34, a threaded rod 36 slideable within the hollow tube, and an adjustable lock nut 37 for controlling the insertion distance of threaded rod 36 into hollow tube 34. Adjustable action arm 30 further includes a lower ball joint 38 that connects the lower end of the threaded rod 36 to a pedal clamp assembly 40. Handle 24 includes two ends 25.

Figure 2:
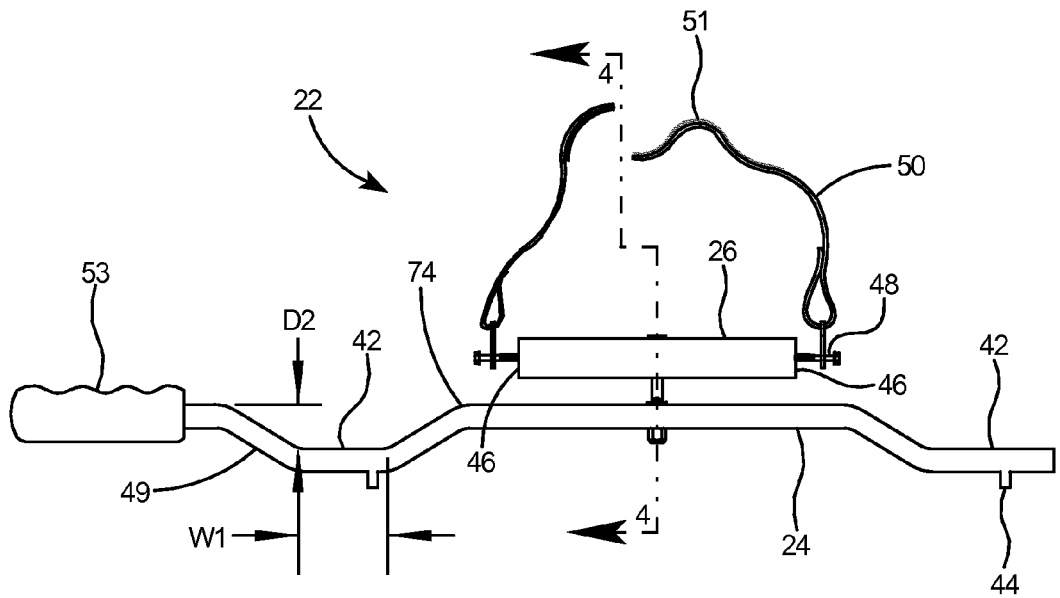
FIG. 2 is a front view of the upper assembly portion of the portable hand converter of FIG. 1.

With reference to FIG. 2, handle 24 of upper assembly 22 further includes two recessed areas 42 and lugs 44. Support plate 26 includes two ends 46 and a pin 48 extending from each end. A strap 50 is attached to each pin 48. Each strap 50 includes a free end 45 with fastening means or strap connector 51 thereon. The fastening means 51 may include a buckle, a ratcheting fastener, or hook and loop fasteners such as VELCRO® brand fasteners that are available from commercial vendors such as Industrial Webbing Corporation in Boynton Beach, Fla. Handle 24 includes a handle extension 49 and a hand grip 53 on the handle extension.

Figure 3:
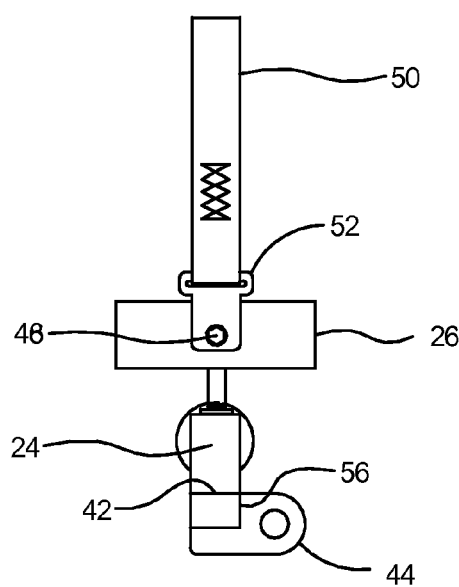
FIG. 3 is a side view of the upper assembly portion of the portable hand converter.
Figure 4:
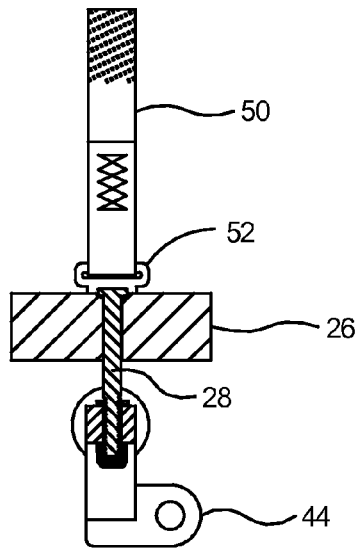
FIG. 4 is a sectional view of the upper assembly taken along line 4-4 of FIG. 2.

Referring to FIGS. 3 and 4, the straps 50 are secured to the support plate 26 by end connectors 52 and pins 48. The lugs 44 extend from the rear surface 56 of the handle 24 at the recessed areas 42 and at a distance substantially away from the pivot point 58 of handle (see FIG. 7).

Figure 7:
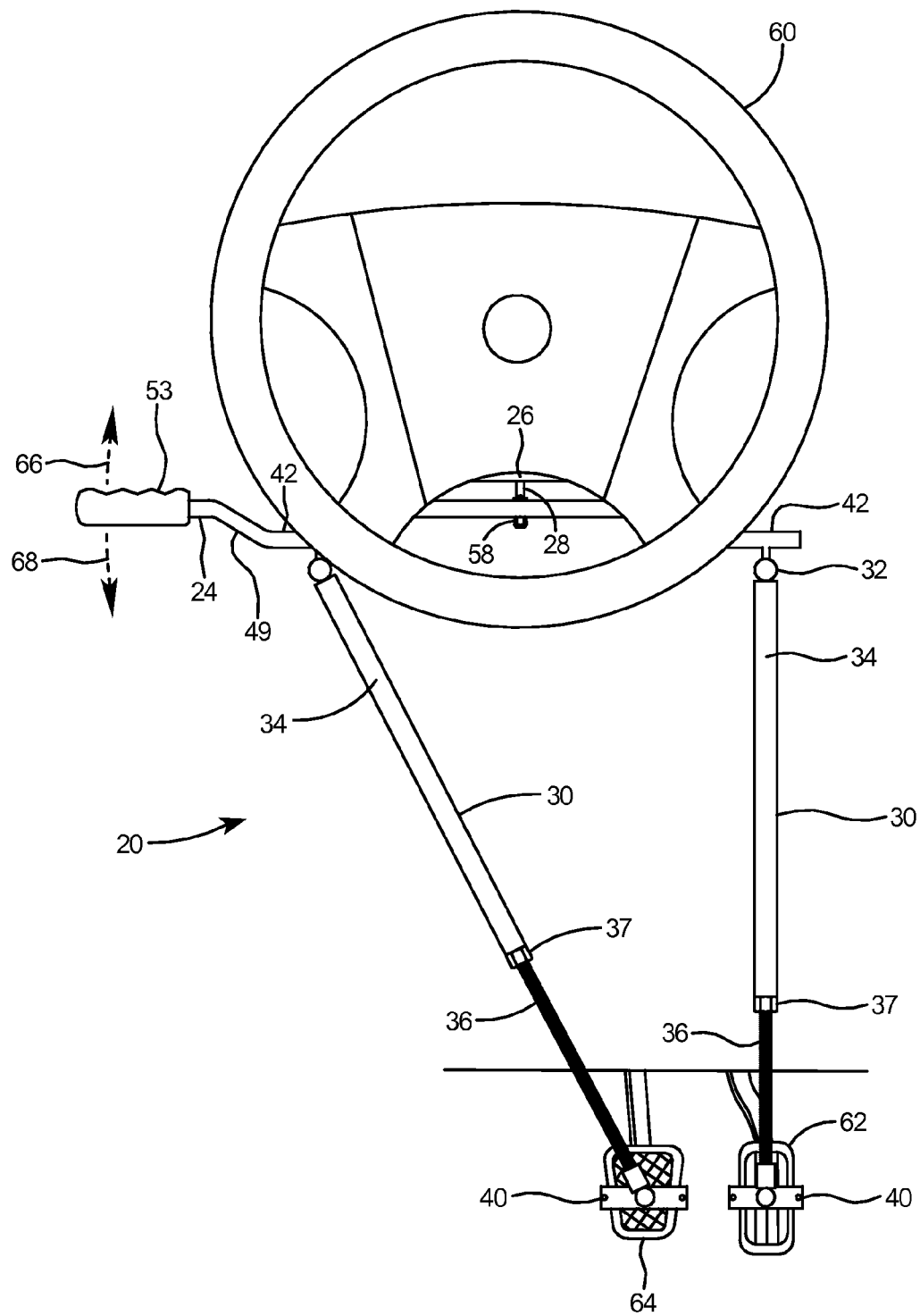
FIG. 7 is a front view of the portable hand converter of the present invention attached to the steering wheel of a vehicle.

As shown in FIG. 7, in a motor vehicle having an automatic transmission, the portable hand converter 20 can be secured to the steering wheel 60 of an automobile or similar steering wheel equipped motor vehicle in order to enable operation of the vehicle completely by the operator's hands. FIG. 7 depicts the portable hand converter 20 with both adjustable action arms 30 in the initial setup position or disengaged position, wherein neither the gas pedal 62 nor brake pedal 64 are depressed or engaged by its corresponding adjustable action arm 30. In the initial setup position, with the handle 24 substantially level, the adjustable lock nuts 37 are tightened on each threaded rod 36 until each respective lock nut 37 contacts the respective hollow tube 34. With the portable hand converter 20 assembled to the steering wheel 60 and the handle 24 substantially level, a pivot point 58 is established at the point that connector bolt 28 connects the handle 24 to the support plate 26. With the handle 24 substantially level, as shown in FIG. 7, neither the gas pedal 62 nor the brake pedal 64 are engaged or depressed.

To operate the portable hand converter 20, the driver simply grasps the grip 53 and moves the handle 24 upward to depress the gas pedal 62 as shown by directional arrow 66 or moves the handle 24 downward to depress the brake pedal 64 as shown by directional arrow 68. A significant safety feature of the portable hand converter 20 is that it prevents the vehicle operator from activating the gas pedal and brake pedal simultaneously. As a result of the pivotal connection 58 of the handle 24 to the support plate 26, as the handle 24 is moved upward the gas pedal 62 will be depressed while at the same time the hollow tube 34 on the brake pedal 64 side will slide upward on the threaded rod 36. Conversely, as the handle 24 is moved downward the brake pedal 64 will be depressed while at the same time the hollow tube 34 on the gas pedal 62 side will slide upward on the threaded rod 36. The upper ball joints 32 enable rotation through two planes in the connection between each hollow tube 34 and the handle 24 and the lower ball joints 38 enable rotation through two planes in the connection between each threaded rod 36 and its respective pedal 62 and 64. Thus, as the handle 24 is pushed up or down, thereby depressing or engaging one of the two pedals 62 and 64, the angle of the handle 24 and the angle of the pedals 62 and 64 with respect to the adjustable action arms 30 can self-adjust to the new position of the handle.

With reference to FIGS. 5-6, the adjustable action arm 30 on the left hand side of the figure is depicted in the disengaged position, such as occurs when the end of the handle (not shown) for that arm 30 is raised. The adjustable action arm 30 on the right hand side of the figure is depicted in the engaged position, such as occurs when the end of the handle (not shown) for that arm 30 is lowered.

Figure 8:
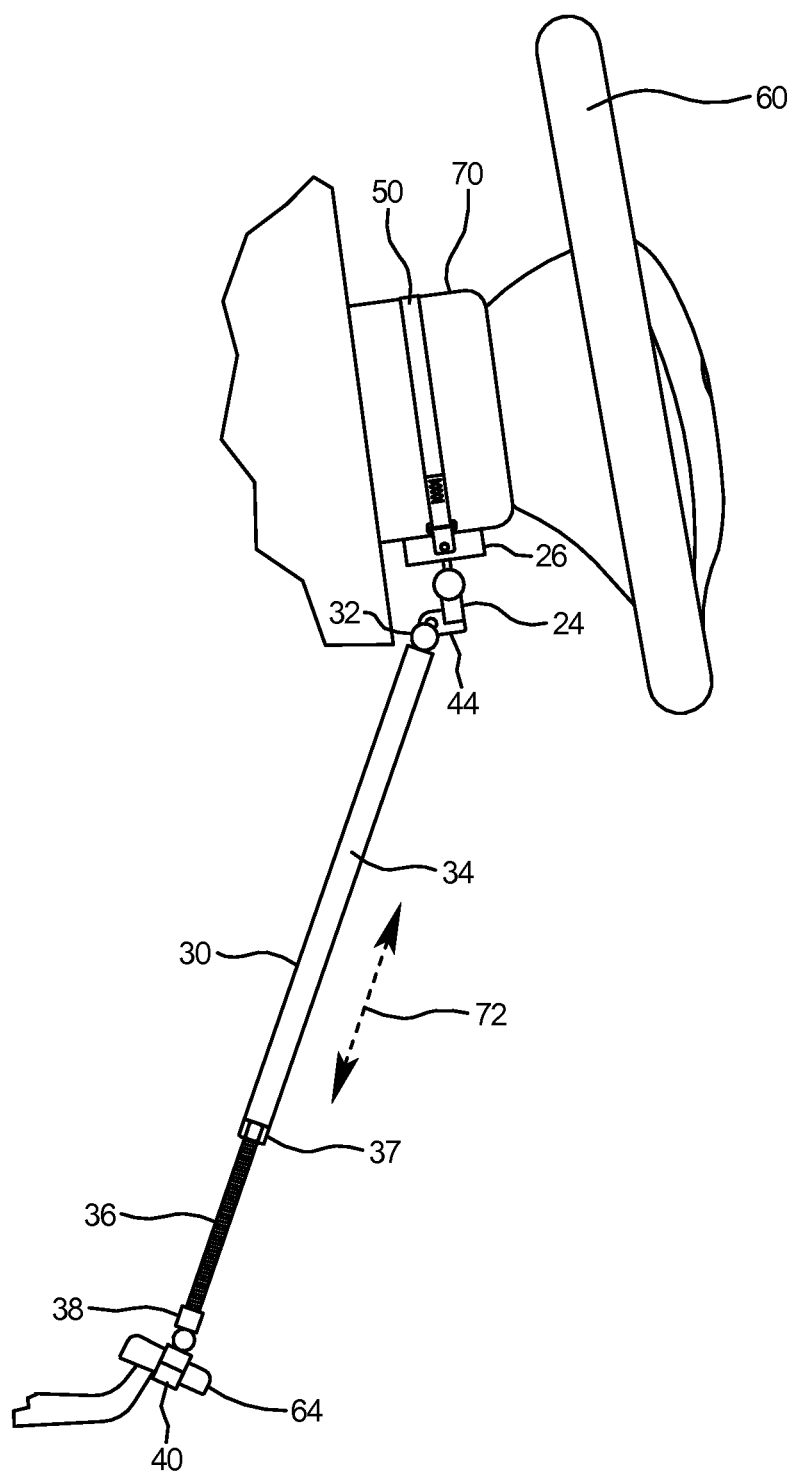
FIG. 8 is a side view of the portable hand converter of the present invention attached to the steering wheel of a vehicle.

As shown in FIG. 8, to install the portable hand converter 20 on an automobile, the strap 50 is tightened on the steering wheel column 70 in order to secure the support plate 26 thereto. The pedal clamp assembly 40 for each adjustable action arm 30 is then tightened to the respective pedal, such as shown for the brake pedal 64 in FIG. 8. With the handle 24 in the unbiased position or substantially level, the adjustable lock nut 37 is adjusted for each pedal to fit the adjustable action arm 30 to the automobile. With the portable hand converter 20 installed as shown in FIG. 8, the driver of the vehicle will be able to control the vehicle's operation using only his or her hands. The upper ball joints 32 and lower ball joints 38 enable the adjustable action arms 30 to move toward or away from the steering wheel as needed for automatic angle adjustments of the action arms 30 during operation of the vehicle. Up or down manipulation of the handle 24 from the unbiased position enables the operator to depress the gas pedal or depress the brake pedal as desired. The up and down movement of the handle will cause the adjustable action arms 30 to move as shown by directional arrow 72. When the handle 24 is moved in one direction to depress or engage one of the pedals, the pedal on the opposing side is disengaged as a result of the hollow tube 34 sliding upward with the handle 24. Thus, when secured to a motor vehicle, the upper ball joints 32 are connected to the handle 24 at the lugs 44 and the lower ball joints 38 are connected to the respective pedals 62 and 64 by the pedal clamp assembly 40.

Referring to FIG. 2, the support plate 26 with hook and loop or similar fasteners, can easily adjust to the length required to attach to the various sizes of steering columns in different motor vehicles. The recesses 42 in the handle 24 provide clearance between the steering wheel and the handle. In order to avoid the interference between the handle 24 and steering wheels of various diameters, the handle can be adjusted on either side from the center 3 to 5 inches to the starting point 74 of the recess. The recesses D2 are at least 1.5 inches minimum in depth with respect to the handle 24 in order to provide adequate travel distance to engage or disengage the gas or brake pedal. The recesses further are 2 inches minimum in width W1 in order to provide adequate clearance for the thickness of the steering wheel grip. The lugs 44 are preferable attached to the handle at the recesses 42.

With reference to FIG. 7, a significant safety feature of the portable hand converter 20 is that it will allow a downward force to be transmitted to only one pedal at a time. Thus while one pedal is engaged, the opposing pedal is disengaged. With the handle grip 53 and handle extension 49 located on the left side of the steering wheel 60 as shown in FIG. 7, raising the handle 24 will simultaneously press down (engage) the gas pedal and release (disengage) the brake pedal. Lowering the handle 24 will simultaneously release (disengage) the gas pedal and press down (engage) the brake pedal.

Figure 9:
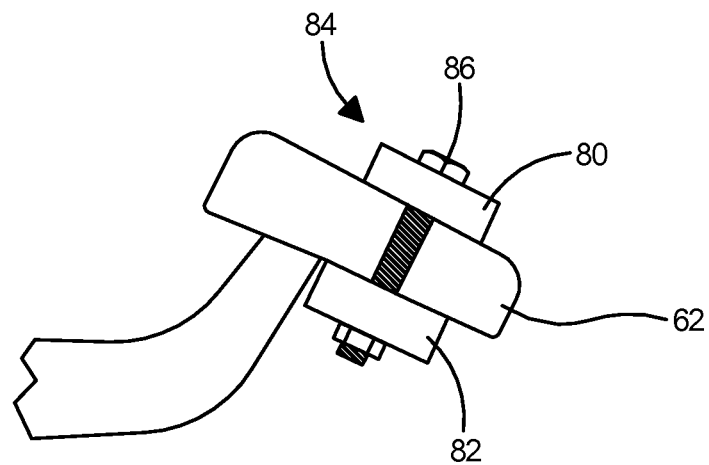
FIG. 9 is a side view of a fastening means for fastening the lower end of the adjustable action arm to a control pedal of a motor vehicle.
Figure 10:
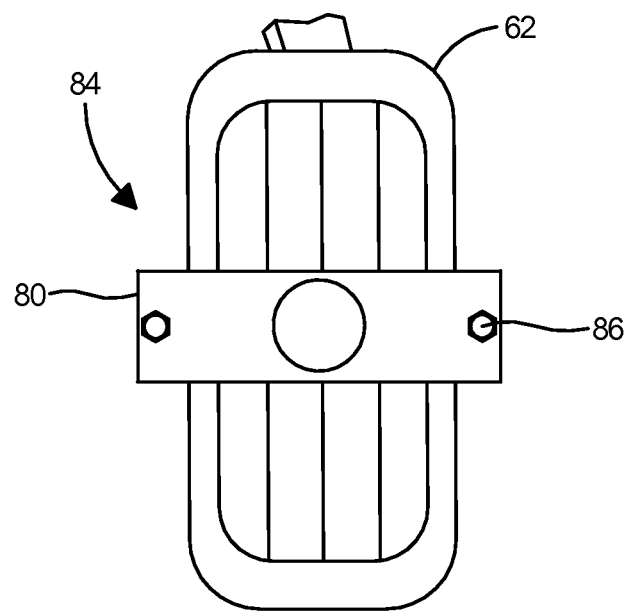
FIG. 10 is a top view of the fastening means of FIG. 9.

Referring to FIGS. 9 and 10, a preferred embodiment of the pedal clamp assembly 40 includes an upper plate 80 and a lower plate 82 which are clamped around the respective pedal, such as shown for the gas pedal 62 of FIG. 9. A securement arrangement 84, consisting of fasteners 86, secures the pedal between the upper plate 80 and the lower plate 82.

The present invention further provides a method of converting a motor vehicle to full operational control by the hands of a driver, including:

1) providing a portable auto hand converter 20 including a support plate 26, a handle 24 having two ends 25, two pedal clamp assemblies 40, and an adjustable action arm assembly 30 extending between each end 25 of the handle 24 and a corresponding pedal clamp assembly 40, each of the adjustable action arm assemblies 30 including a hollow tube 34, a threaded rod 36, and an adjustable lock nut 37;

2) attaching the support plate 26 to the steering column 70 of a motor vehicle to create a pivot point 58 of the handle 24 with respect to the support plate 26 and steering column 70;

3) sliding each of the threaded rods 36 within the corresponding hollow tubes 34 to adjust the length of each of the adjustable action arms 30 to span between the handle 24 and corresponding pedal clamp assembly 40 and maintain the handle substantially level;

4) clamping each of the pedal clamp assemblies 40 to a corresponding pedal 62 and 64 of the motor vehicle;

5) maintaining the handle level; and 6) tightening each adjustable lock nut 37 on the corresponding threaded rod 36 until the hollow tube 34 is in contact with the handle 24, whereby up or down manipulation of the handle 24 from the unbiased level position enables the operator to depress the gas pedal 62 or depress the brake pedal 64 as desired.

The portable hand converter 20 of the present invention can be used for both right-hand traffic (USA, Canada, etc.) and left-hand traffic (UK, Australia, etc.). It is also within the scope of the invention to locate the handle grip 53 and handle extension 49 on the right side of the steering wheel 60 if operation of the vehicle with the operator's right hand is desired.

The material of construction of the handle 24, support plate 26, adjustable action arms 30, and clamps includes steel, heat treated aluminum and titanium, engineering plastics, or a combination of those. The straps 50 may be constructed of nylon or similar high strength fabrics.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment herein was chosen and described in order to best explain the principles of the invention and the practical application, and to enable others of ordinary skill in the art to understand the invention for various embodiments with various modifications as are suited to the particular use contemplated.

What is claimed is:

1. A portable auto hand converter comprising: an upper assembly including a support plate and a handle pivotally connected at a pivot point to said support plate; said handle including a center portion, two ends, and a recessed area at each end; two adjustable action arms including first ends and second ends, each of said adjustable action arms rotatably connected at said first ends to one of said recessed areas of said handle; said adjustable action arms include a hollow tube and a threaded rod slideable within said hollow tube; said pivot point connected to said handle between the connection points of said first ends of said adjustable action arms; said pivot point including a bolt extending from said support plate and extending directly through said center portion of said handle; said adjustable action arms rotatably connected at said second ends to a pedal clamp assembly; and a handle extension on said handle.

2. The portable auto hand converter of claim 1 including an attachment means for attaching said support plate to the steering column of a motor vehicle.

3. The portable auto hand converter of claim 2 wherein said attachment means includes
   a strap extending from said support plate, said strap including a free end; and
   fastening means on said free end of said strap.

4. The portable auto hand converter of claim 3 wherein said fastening means on said free end of said strap includes hook and loop fasteners.

5. The portable auto hand converter of claim 1 including
   said handle extension extending from one end of said handle; and
   a hand grip on said handle extension.

6. The portable auto hand converter of claim 1 wherein said adjustable action arms include an adjustable lock nut for controlling the extension of said hollow tube with respect to said threaded rod.

7. The portable auto hand converter of claim 1 including an upper ball joint connecting each of said first ends of said adjustable action arms to said handle.

8. The portable auto hand converter of claim 1 including a lower ball joint connecting each of said second ends of said adjustable action arms to said pedal clamp assembly.

9. The portable auto hand converter of claim 1 including a connector bolt extending between said handle and said support plate.

10. The portable auto hand converter of claim 1, wherein said pedal clamp assembly includes
    an upper plate;
    a lower plate; and
    a securement arrangement for securing said upper plate to said lower plate.

11. The portable auto hand converter of claim 1 wherein said support plate includes two ends; and
    said upper assembly includes a pin extending from each end of said support plate.

12. The portable auto hand converter of claim 1 including a lug extending from said handle at each of said recessed areas.

* * * * *